W. H. LEE.
DRAFT SHIFTING MEANS FOR SULKY PLOWS.
APPLICATION FILED JULY 2, 1912.

1,105,593.

Patented July 28, 1914.
2 SHEETS—SHEET 1.

WITNESSES:

INVENTOR
William H. Lee
BY
ATTORNEYS

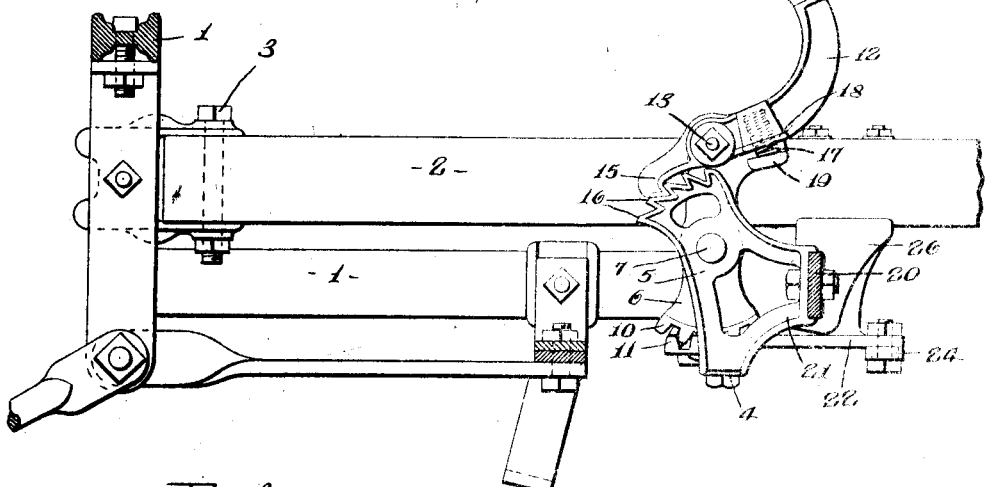
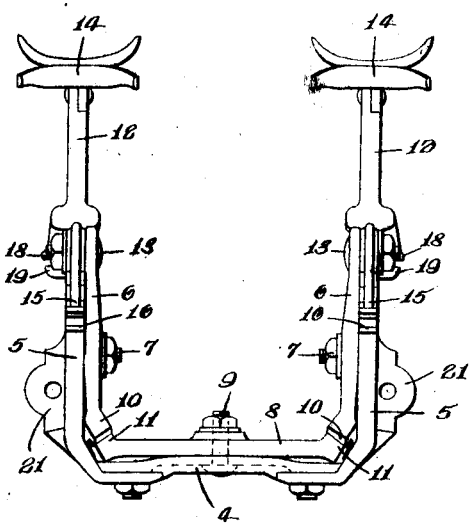
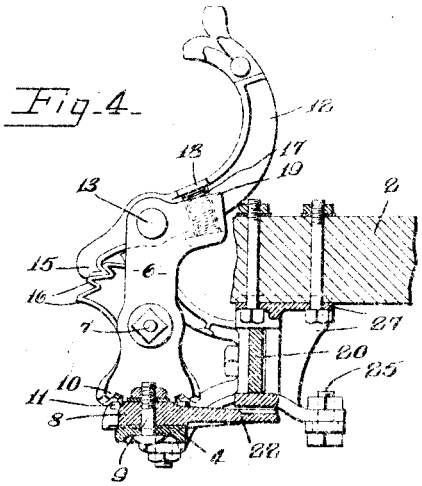

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

DRAFT-SHIFTING MEANS FOR SULKY-PLOWS.

1,105,593.  Specification of Letters Patent.  Patented July 28, 1914.

Application filed July 2, 1912. Serial No. 707,144.

*To all whom it may concern:*

Be it known that I, WILLIAM H. LEE, of Syracuse, in the county of Onondaga and State of New York, have invented a certain new and useful Draft-Shifting Means for Sulky-Plows, of which the following is a specification.

This invention relates to sulky plows and particularly to means for shifting the line of draft of the plow relatively to the line of travel in order to cause the earth turning element to take more or less into the land; and the invention consists in the combinations and constructions hereinafter set forth and claimed.

In describing this invention reference is had to the accompanying drawings in which like characters designate corresponding parts in all the views.

Figure 1:
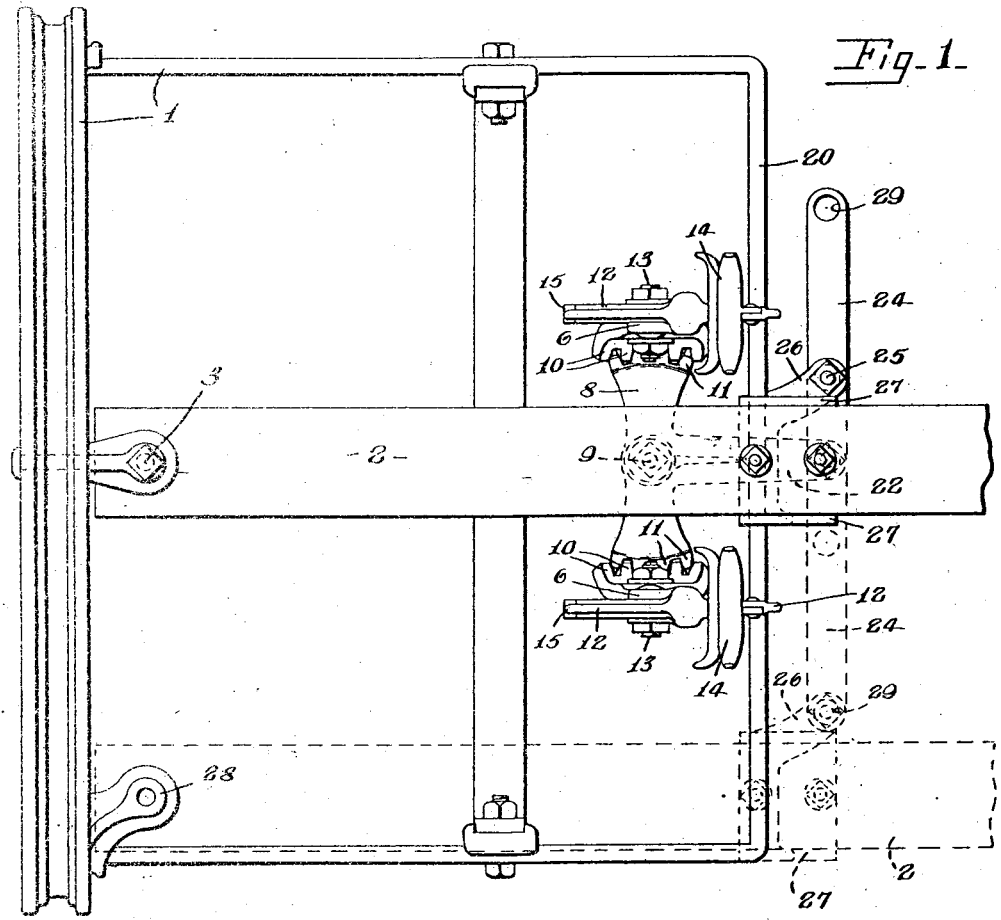
Figure 5:
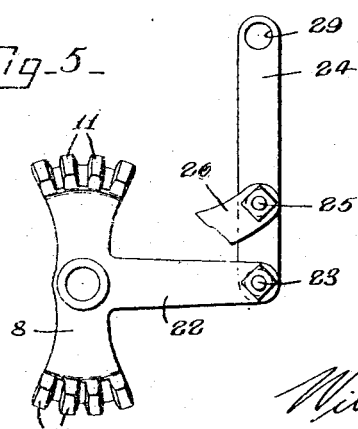

Figure 1 is a plan view of a portion of the frame of a sulky plow provided with my invention. Fig. 2 is a longitudinal sectional view on Fig. 1 showing the shifting mechanism in side elevation. Fig. 3 is a rear elevation of the shifting mechanism. Fig. 4 is a side elevation, partly in section, of such mechanism, contiguous portions of the draft controlling element and associated parts being also shown in section. Fig. 5 is a plan view of the intermediate power-transmitting member of said mechanism, and contiguous parts.

In the illustrated embodiment of my invention the draft controlling element is shown as a pole pivoted to the frame of the plow, and in operation the frame which carries the earth turning element is shiftable relatively to the pole about the pivot of the pole for causing the earth turning element to take more or less into the land, as will be understood by those skilled in the art, but as the subject matter of this application is commercially known as a pole shifter, and as it is more convenient to consider the pole as shifting relatively to the frame of the plow, the pole will, throughout this specification, be described as shifting about its pivot relatively to the frame of the sulky plow. It will be understood, however, that any draft controlling element other than a pole may be employed with my shifting mechanism.

1 is the frame of the sulky plow which may be of any desirable form, size and construction.

2 is a pole pivoted at 3 to the frame and shiftable about its pivot relatively to the frame in order to change the line of draft relatively to the line of travel of the plow.

4 is a support for the movable parts of mechanism for shifting the draft controlling element or pole 2, the support having an intermediate portion and sides or arms 5 spaced apart and projecting from the intermediate portion. In this form of my invention the intermediate portion of the support 4 is illustrated as horizontal, and the arms 5 are shown as extending vertically and upwardly from said intermediate portion.

6 are levers forming part of right and left operating members, the levers 6 being pivoted at 7 between their ends to the sides or arms of the support 4 and being located on the inner sides of said arms.

8 is a member for transmitting the motion of either lever 6 to the pole 2, said member 8 being located on the upper side of the intermediate portion of the support 4 between the levers 6 and being pivoted intermediate of its ends at 9 to the support 4 and coacting on opposite sides of its pivot with the levers 6, the pivotal axis of the member 8 being arranged at substantially a right angle to the pivotal axes of the levers 6 and the levers 6 and the member 8 being preferably provided with intermeshing gear teeth 10, 11.

12 are primary actuating levers forming part of the operating members. Said levers 12 are pivoted to the upper ends of the levers 6 on pivots 13 extending parallel to the pivots 7, and are provided with pedals 14 at their upper ends and with rigid pawls 15 at their lower ends which coact with ratchet teeth 16 on the upper ends of the arms 5 to hold the pole in its adjusted position. During the initial part of its movement, each actuating lever 12 is movable relatively to its associated lever 6 against the action of a spring 17 interposed between the levers 6 and 12, this initial relative movement of each lever 12 being sufficient to disengage its pawl 15 from the corresponding ratchet teeth 16, and after such pawl has been disengaged from the said ratchet teeth 16, shoulders 18 provided on each lever 12 engage shoulders 19 on the corresponding lever 6 so that additional forward movement of the lever 12 will also actuate the associated lever 6 as a unit therewith. The movement of either lever 6 is transmitted to the member 8 and from said member 8 to the pole as hereinafter described, and during the movement of one lever 12 forwardly, the pawl 15 of the other lever 12 is ratcheting rearwardly on the corresponding ratchet teeth 16.

The support 4 may be carried by either of the relatively shiftable members 1, 2 and is here shown as carried by the frame 1 on the front cross bar 20 thereof arranged in advance of the pivot 3, and as having its arms 5 formed with forwardly extending brackets 21 bolted to said cross bar. The motion of the member 8 is transmitted to the pole by means of an arm 22 projecting forwardly from an intermediate portion of said member 8 at an angle to the axis of said member and lengthwise of the line of draft and connected at its front end to the pole 2. As here illustrated, said arm 22 is pivoted at 23 to a link 24 associated with the pole 2, the link extending transversely of the pole and being pivoted at 25 to an arm 26 on a bracket 27 secured to and depending from the pole 2. The arm 26 extends forwardly from the main portion of the bracket 27 at one side of the line of draft, and of the arm 22 of the pivoted member 8; and the bracket 27, as shown in Figs. 2 and 3, is provided with means, as rearwardly projecting shoulders, slidable along the frame bar 20 for permitting relative lateral movement of the frame and the pole 2, and coacting with upper and lower edges of said bar to prevent relative vertical movement of the frame and pole. However, if the support 4 were carried by the pole 2 said member 8 would be fulcrumed against the frame. As it is sometimes desirable to shift the pole bodily from a central position to one side, as to the right side of the frame, (as indicated in dotted lines, Fig. 1,) for the purpose of accommodating a three horse team, the support 4 of the pole shifting means is preferably carried by the frame 1 so that said pole shifting means will always bear the same relation to the seat of the plow. When the pole is shifted into the position shown in dotted lines, the pivot 3 passes through a second pivot bearing provided in a bracket 28 provided on the frame and the pivot 25 connecting the arm 26 to the link 24 is withdrawn, and inserted in a second hole as 29 provided for that purpose.

What I claim is:

1. In a plow, the combination of an element for controlling the direction of the line of draft relatively to the line of travel of the plow, said element being shiftable, and mechanism for shifting the draft controlling element comprising right and left substantially parallel operating members, and means for transmitting the movement of said members to the draft controlling element, substantially as and for the purpose described.

2. In a plow, the combination of an element for controlling the direction of the line of draft relatively to the line of travel of the plow, said element being shiftable, and mechanism for shifting the draft controlling element comprising right and left operating members including levers movable in vertically extending planes, and means for transmitting the movement of the levers to the draft controlling element, substantially as and for the purpose specified.

3. In a plow, the combination of an element for controlling the direction of the line of draft relatively to the line of travel of the plow, said element being shiftable, and mechanism for shifting the draft controlling element comprising right and left operating members including levers movable in substantially vertical planes, and a rocking member pivoted between its ends and coacting on opposite sides of its pivot with said levers, substantially as and for the purpose set forth.

4. In a plow, the combination of an element for controlling the direction of the line of draft relatively to the line of travel of the plow, said element being shiftable, and mechanism for shifting the draft controlling element comprising right and left operating members including pivoted levers movable about their pivotal axes in substantially vertical planes, and a pivoted rocking member movable about its axis in a substantially horizontal plane and coacting on opposite sides of its pivot with said levers, substantially as and for the purpose described.

5. In a plow, the combination of an element for controlling the direction of the line of draft relatively to the line of travel of the plow, said element being shiftable, and mechanism for shifting the draft controlling element comprising right and left levers movable in substantially parallel vertical planes and provided with gear teeth, and means for transmitting the movement of the levers to said element comprising a member pivoted between its ends between said levers and being provided on opposite sides of its pivot with teeth coacting with the teeth of the levers, substantially as and for the purpose described.

6. In a plow, the combination of an element for controlling the direction of the line of draft relatively to the line of travel of the plow, said element being shiftable, and mechanism for shifting the draft controlling element comprising right and left levers, and means for transmitting the movement of the levers to said element comprising a member pivoted between its ends between said levers and being provided on opposite sides of its pivot with means coacting with the levers, said member having an arm projecting at an angle to the axis thereof from a point intermediate of the ends of said members, and a link extending transversely relatively to the draft controlling element and pivotally connected to said element and arm, substantially as and for the purpose specified.

7. In a plow, the combination of an element for controlling the direction of the line of draft relatively to the line of travel of the plow, said element being shiftable, a bracket depending from the element and having an arm extending at one side of the line of draft, and mechanism for shifting the draft controlling element comprising right and left levers, and means for transmitting the movement of the levers to said element comprising a pivoted member coacting with said levers and having an arm extending substantially lengthwise of the line of draft and at one side of the first-mentioned arm, and a link extending transversely relatively to the draft controlling element and pivotally connected to the arm of the bracket and the arm of the pivoted member, substantially as and for the purpose set forth.

8. In a plow, the combination of a frame having a front cross bar, an element for controlling the direction of the line of draft relatively to the line of travel of the plow, said element being pivoted at the rear of the cross bar, a bracket depending from the element and having means slidably engaging upper and lower surfaces of the cross bar for permitting relative lateral movement of the frame and the element and preventing relative vertical movement of the frame and the element, and mechanism for shifting the draft controlling element comprising right and left levers, and means for transmitting the movement of the levers to said element, substantially as and for the purpose described.

9. In a plow, the combination of a frame having a front cross bar, an element for controlling the direction of the line of draft relatively to the line of travel of the plow, said element being pivoted at the rear of the cross bar, a bracket depending from the element and having means slidably engaging upper and lower surfaces of the cross bar for permitting relative lateral movement of the frame and the element and preventing relative vertical movement of the frame and the element, said bracket having an arm at one side of the line of draft, and mechanism for shifting the draft controlling element comprising right and left levers movable in substantially parallel vertical planes and provided with gear teeth, and means for transmitting the movement of the levers to said element comprising a member pivoted between its ends between said levers and being provided on opposite sides of its pivot with teeth coacting with the teeth of the levers, said member having an arm projecting at an angle to the axis thereof substantially lengthwise of the line of draft from a point intermediate of the ends of said member and extending at one side of the first-mentioned arm, and a link extending transversely relatively to the draft controlling element and pivotally connected to said arms, substantially as and for the purpose specified.

10. In a plow, the combination of an element for controlling the direction of the line of draft relatively to the line of travel of the plow, said element being shiftable, and mechanism for shifting the draft controlling element including a support comprising opposing fixed sides spaced apart and each provided with ratchet teeth, right and left operating members comprising levers pivoted to said sides respectively, levers pivoted to the former levers and having pawls coacting with the ratchet teeth of said sides respectively, and means for transmitting the motion of the first-mentioned levers to the draft controlling element comprising a member arranged in horizontal position at an angle to the levers and pivoted between its ends and coacting at its opposite ends respectively with the first-mentioned levers, substantially as and for the purpose specified.

11. In a plow, the combination of an element for controlling the direction of the line of draft relatively to the line of travel of the plow, said element being shiftable, and mechanism for shifting the draft controlling element including a support comprising an intermediate portion, and opposing sides projecting from said intermediate portion and being spaced apart, right and left operating members including levers pivoted respectively to said sides, and means for transmitting the movement of the levers to the draft controlling element comprising a member pivoted to the intermediate portion of the support, and coacting on opposite sides of its pivot with said levers, substantially as and for the purpose set forth.

12. In a plow, the combination of a frame, an element for controlling the direction of the line of draft relatively to the line of travel of the plow, said element being shiftable, and mechanism for shifting the draft controlling element including a support carried by the frame of the plow, the support having an intermediate horizontal portion, and opposing sides projecting from said intermediate portion and being spaced apart, right and left operating members including levers pivoted respectively to said sides, and means for transmitting the motion of the levers to the draft controlling element comprising a member pivoted to the intermediate portion of the support and coacting on opposite sides of its pivot with said levers, substantially as and for the purpose described.

13. In a plow, the combination of a frame, an element for controlling the direction of the line of draft relatively to the line of travel of the plow, said element being shiftable, and mechanism for shifting the draft controlling element including a support secured to the frame of the plow and comprising an intermediate portion, opposing sides projecting upwardly from said intermediate portion and being spaced apart, the sides being provided with ratchet teeth, operating means comprising levers pivoted between their ends to the sides and having gear teeth at corresponding ends, upwardly extending actuating levers pivoted to the former levers on axes extending substantially parallel to the axes of the former levers, the actuating levers having pawls coacting with the ratchet teeth, and means for transmitting the movement of the first-mentioned levers to the draft controlling element comprising a member arranged in horizontal position and pivoted to the intermediate portion of the support midway between the sides and having teeth on opposite sides of its pivot coacting with the teeth of the first-mentioned levers, substantially as and for the purpose specified.

14. In a plow, the combination of a frame, an element for controlling the direction of the line of draft relatively to the line of travel of the plow, said element being shiftable, and mechanism for shifting the draft controlling element including a support having an intermediate horizontal portion and opposing sides projecting from said intermediate portion and being spaced apart, said sides being fixed independently to the frame, operating members carried by the sides, and a member carried by the intermediate portion of the support and coacting with the operating members, the member carried by the intermediate portion of the support being connected to said element, substantially as and for the purpose set forth.

15. In a plow, the combination of two elements, one a frame, and the other a pole pivoted to the frame, and mechanism for effecting relative movement of the pole and frame about the axis of said pivot comprising substantially parallel right and left operating members movable in substantially vertical planes, and means for transmitting the movement of said members to one of said elements, substantially as and for the purpose set forth.

16. In a plow, a frame, a pivoted element for controlling the direction of the line of draft relatively to the line of travel of the plow, said element being shiftable about its pivot and also bodily relatively to the frame, and the frame being provided with a plurality of points of attachment for said element to any one of which said element may be secured, mechanism for shifting the draft controlling element about its axis, and means for connecting said mechanism and said element in any of the positions to which said element is shifted bodily relatively to the frame, substantially as and for the purpose described.

17. In a plow, the combination of a frame, a pivoted element for controlling the direction of the line of draft relatively to the line of travel of the plow, said element being shiftable about its pivot and also bodily relatively to the frame, and the frame being formed with a plurality of pivot bearings for said element to any one of which said element may be pivoted, and mechanism for shifting the draft controlling element about its axis comprising a movable member, and a link extending transversely of said element and being movable therewith, and being connected to said member and adapted to be connected at a plurality of points along its length to said element, substantially as and for the purpose specified.

18. In a plow, the combination of a frame, a pivoted element for controlling the direction of the line of draft relatively to the line of travel of the plow, said element being shiftable about its pivot and also bodily relatively to the frame, and the frame being formed with a plurality of pivot bearings for said element to any one of which said element may be pivoted, and mechanism for shifting the draft controlling element about its axis comprising right and left operating levers, a rocking member pivoted between its ends and coacting at opposite sides of its pivot with said levers, and a link extending transversely of said element and being movable therewith and being adapted to be connected at any one of a plurality of points along its length to the pivoted element, substantially as and for the purpose described.

In testimony whereof, I have hereunto signed my name in the presence of two attesting witnesses, at Syracuse, in the county of Onondaga, in the State of New York, this 10th day of May 1912.

WILLIAM H. LEE.

Witnesses:
CHAS. H. YOUNG,
J. R. JOHNSON.